US 008713676B2

(12) United States Patent
Pandrangi et al.

(10) Patent No.: US 8,713,676 B2
(45) Date of Patent: Apr. 29, 2014

(54) SYSTEMS AND METHODS FOR IDENTIFYING MALICIOUS DOMAINS USING INTERNET-WIDE DNS LOOKUP PATTERNS

(75) Inventors: Ramakant Pandrangi, Vienna, VA (US); Nicholas G. Feamster, Atlanta, GA (US); Shuang Hao, Atlanta, GA (US)

(73) Assignees: Verisign, Inc., Reston, VA (US); Georgia Tech Research Corporation, Atlanta, GA (US)

( * ) Notice: Subject to any disclaimer, the term of this patent is extended or adjusted under 35 U.S.C. 154(b) by 123 days.

(21) Appl. No.: 13/107,201

(22) Filed: May 13, 2011

(65) Prior Publication Data
US 2011/0283357 A1 Nov. 17, 2011

Related U.S. Application Data

(60) Provisional application No. 61/334,392, filed on May 13, 2010.

(51) Int. Cl.
H04L 29/06 (2006.01)
(52) U.S. Cl.
USPC ............................ 726/22; 726/26; 726/27
(58) Field of Classification Search
USPC ....................................................... 726/22
See application file for complete search history.

(56) References Cited

U.S. PATENT DOCUMENTS 6,167,446 A * 12/2000 Lister et al. ................ 709/223
7,584,507 B1 9/2009 Nucci
7,626,940 B2 * 12/2009 Jain ............................. 370/252
7,634,808 B1 * 12/2009 Szor et al. ..................... 726/22
7,676,217 B2 3/2010 Zhu et al.
7,756,065 B2 * 7/2010 Chung et al. ................ 370/255
8,020,207 B2 * 9/2011 Chow et al. ................... 726/22
8,117,296 B2 * 2/2012 Liu et al. ...................... 709/223
8,347,394 B1 * 1/2013 Lee ............................... 726/25
2004/0073707 A1 * 4/2004 Dillon ........................... 709/245

(Continued)

FOREIGN PATENT DOCUMENTS

EP      1 211 863 A1    6/2002
KR    20090001505 A     1/2009
KR    20090102410 A     9/2009
WO  WO 2009/155453 A1  12/2009

OTHER PUBLICATIONS

Perdisci, R. "Detecting Malicious Flux Service Networks through Passive Analysis of Recursive DNS Traces". Dec. 7-11, 2009. ACSAC 09, pp. 311-320. Retrieved from: IEEEXplore.*

(Continued)

Primary Examiner — Mohammad L Rahman
(74) Attorney, Agent, or Firm — MH2 Technology Law Group, LLP

(57) ABSTRACT

Systems and methods are disclosed for identifying domains as malicious based on Internet-wide DNS lookup patterns. Disclosed embodiments look for variance in the servers that look up a domain and also look at the popularity growth (quantity of queries from unique addresses) of a domain after registration to identify malicious domains. Other disclosed embodiments measure the similarity of servers that query a domain and cluster domains based on the similarity of those servers. Disclosed embodiments may use such temporal and spatial lookup patterns as input to a blacklist process to more effectively and quickly blacklist domains based on their Internet-wide lookup patterns.

28 Claims, 5 Drawing Sheets

(56) References Cited

U.S. PATENT DOCUMENTS

| | | | |
|---|---|---|---|
| 2006/0015942 A1* | 1/2006 | Judge et al. | 726/24 |
| 2007/0039038 A1 | 2/2007 | Goodman et al. | |
| 2007/0118669 A1 | 5/2007 | Rand et al. | |
| 2008/0028463 A1 | 1/2008 | Dagon et al. | |
| 2008/0155694 A1* | 6/2008 | Kwon et al. | 726/23 |
| 2008/0301281 A1 | 12/2008 | Wang et al. | |
| 2008/0307222 A1 | 12/2008 | Chow et al. | |
| 2009/0178109 A1 | 7/2009 | Nice et al. | |
| 2009/0300768 A1 | 12/2009 | Krishnamurthy et al. | |
| 2010/0031362 A1 | 2/2010 | Himberger et al. | |
| 2010/0037314 A1* | 2/2010 | Perdisci et al. | 726/22 |
| 2010/0332601 A1 | 12/2010 | Walter et al. | |
| 2012/0158626 A1* | 6/2012 | Zhu et al. | 706/13 |

OTHER PUBLICATIONS

International Search Report and Written Opinion for Int'l Appln. No. PCT/US2011/36415, Sep. 1, 2011 (8 pages).

Matthew Knysz et al., "Charlatans' Web: Analysis and Application of Global IP-Usage Patterns of Fast-Flux Botnets," University of Michigan Ann Arbor, pp. 1-22. Report Date: Jan. 6, 2011.

Andrew G. West et al., "Mitigating Spam Using Spatio-Temporal Reputation," Department of Computer & Information Science, Technical Reports (CIS), University of Pennsylvania, Year 2010, pp. 1-20.

* cited by examiner

SYSTEMS AND METHODS FOR IDENTIFYING MALICIOUS DOMAINS USING INTERNET-WIDE DNS LOOKUP PATTERNS

This application claims priority to U.S. Provisional Application No. 61/334,392 filed May 13, 2010, the disclosure of which is hereby incorporated by reference herein in its entirety.

FIELD

This disclosure is generally directed to systems and methods for analyzing the DNS lookup patterns from a large authoritative top-level domain server and, more particularly, systems and methods for identifying unscrupulous domains by analyzing how the lookup patterns for unscrupulous domains differ from those for legitimate domains.

BACKGROUND

The growth of computer networking has brought with it domains used for unscrupulous activities. Such domains may be used for scams, phishing, spamming, botnet command-and-control activities, etc. The ability to perpetrate such malicious activity depends on coordinating a large collection of hosts to perform a particular activity. Operators of these large-scale operations typically use the Domain Name System (DNS) to help direct hosts to the appropriate location on the network because the major task of the DNS system is to maintain the mapping between the host names and the Internet protocol (IP) addresses of a Web site. In the case of attacks such as spam and phishing attacks, these domains may be used to direct victims to a Web site (or through a proxy) that is hosting malicious content. In the case of botnet command-and-control, bots may locate the "controller" machine according to its domain name.

For these reasons and others, the ability to identify domain names that correspond to unscrupulous activity or otherwise unwanted traffic may be extremely valuable. Characterizing the behavior of these domains may not only help identify domains used for malicious behavior, but may also help identify individual attacking hosts and victim hosts.

Top-level domain (TLD) servers are responsible for maintaining zone information (usually second-level domains) and for answering the queries directed to registered domains. For example, VeriSign, Inc. operates the generic top-level domains (gTLDs) for .com and .net. The top-level domain servers generally maintain two kinds of dynamics about the second-level domains (2LDs). The first type of information is the Domain Name Zone Alert (DNZA). This information includes data about changes in the zone, for example, whether a domain name was newly registered or a name server's Internet Protocol (IP) address was modified. The DNZA files track these changes.

The second type of information concerns the DNS queries submitted by the recursive servers. A recursive server receives a DNS request from a user's computer and, in turn, sends a request to a top-level domain server to process the user's request. Each recursive server represents a different geographical region, and the recursive servers may be grouped into sub-network blocks by region using the prefix of the IP address of the recursive servers. The prefix may be the /24 sub-network prefix, and the recursive servers with the same prefix may be referred to as a sub-network, or a /24 sub-network.

When the recursive servers send queries to a TLD server for resolving the 2LD domains names, the TLD server may store records of the queries. The TLD server, or a central repository, may aggregate the source IP addresses of the queries into /24 sub-networks. This may allow a TLD server or a central repository to monitor the number of queries for each domain. A query record may show the relationship between the domain names and the /24 sub-networks submitting queries. Examples of a DNZA record and a DNS query record are shown in Table 1.

TABLE 1

| Data format examples | |
|---|---|
| type | example |
| DNZA entry | add-new example.com NS ns1.example.com |
| Query record | example.com 111.111.111.0.22.22.22.0 3 |

The DNZA entry shows that an "add-new" command created a new domain example.com and the name space (NS) record is ns1.example.com. The query record shows that there were 3 queries from the /24 subnets of "111.111.111.0" and "22.22.22.0" for the domain "example.com." On an average day, a TLD server may handle queries for 80 million different domains.

Once a domain gets registered, several basic entries, called Resource Records, are created to refer to the services for the domain. The major Resource Records may include, NS-type records that point to the authoritative name servers for the zone, MX-type records that point to the domains' mail servers, and A-type records that point to the host representing the domain. The NS- and MX-type records can further resolve to IP addresses. The number of IP addresses associated with the NS- and MX-type records is typically much less than the number of the domains being registered because the same server may be repeatedly used by many different domains to hose DNS infrastructure.

Certain methods of characterizing DNS lookup behavior characterize DNS lookup behavior from different vantage points, such as below the local recursive resolver within an organization. These methods recognize that hosts within a single enterprise may exhibit coordinated lookup behavior to malicious domains, so clustering their activity patterns may yield information about the reputation of individual domains. But, because malicious activity often relies on coordinated activity across multiple servers, the view of DNS lookup behavior below a single recursive DNS resolver fails to capture behavior unique to malicious domains but visible only from a perspective that captures lookup behavior across servers, among other things.

For example, the Proactive Domain Blacklisting work by M. Felegyhazi, C. Kreibich, and V. Paxson in Third USENIX Workshop on Large-Scale Exploits and Emergent Threats (LEET '10), 2010, focuses on the domain registration and DNS zone information to predict the malicious use of domains. This study, however, fails to take advantage of the lookup patterns to the domains, including the addresses of the recursive DNS servers and number of queries from the servers.

SUMMARY

Disclosed embodiments provide methods and systems for identifying malicious domains based on DNS lookup patterns from a large authoritative top-level domain server. Methods consistent with disclosed embodiments identify malicious domains based on, for example, the degree of variance in the servers that look up the domains, the clustering of servers that look up the domains, the length of time after registration that it takes for a domain to become widely popular, etc. Once malicious or potentially malicious domains are identified, the system may blacklist the sites to curb the malicious behavior, and may also help identify victim hosts.

Consistent with disclosed embodiments, a method is provided for determining that a newly-registered domain is potentially malicious. The method may include determining the number of unique servers that sent a query for the newly-registered domain during a period of time and determining whether the number of unique servers exceeds a predetermined threshold of servers. The method may further include flagging the newly-registered domain as potentially malicious when it is determined that the number of unique servers exceeds the predetermined threshold of servers. In some embodiments, the method may further include identifying an IP address associated with a registration record for the newly-registered domain, determining a confidence level based on whether the IP address is associated with a tainted server, and automatically adding the newly-registered domain to a blacklist when the confidence level is high. In some embodiments the confidence level may be based on an amount by which the number of unique servers exceeds the predetermined threshold of servers.

Consistent with other disclosed embodiments, a system is provided for identifying an Internet domain as potentially malicious. The system may comprise a processor and a memory storing instructions that, when executed by the processor, cause the processor to perform operations. The operations may comprise identifying unique servers that query the domain during a first day and during a second day. The operations may further comprise determining the similarity of the servers that queried the domain during the first day the servers that queried the domain during the second day and determining whether the similarity of the servers meets a predetermined threshold. The operations may further comprise flagging the domain as potentially malicious when it is determined that the similarity of the servers meets a predetermined threshold. In some embodiments, the method may further comprise adjusting the predetermined threshold base on data used to flag the domain as potentially malicious.

Consistent with disclosed embodiments, a method is provided for identifying an Internet domain as potentially malicious. The method may include identifying a set of domains, the set including at least one known malicious domain and determining the number of servers that query each domain in the set for each day over a period of time. For a plurality of pairs of domains from the set of domains, the method may further include analyzing the similarity of servers that queried a first domain of the pair of domains and servers that queried a second domain of the pair of domains. The method may further include grouping the domains based on the analyzing and flagging the domains in a group that contains the known malicious domain as potentially malicious. In some embodiments, each server in the set of servers may be an aggregation of servers sharing the same IP address prefix. In other embodiments, Consistent with other disclosed embodiments, computer-readable media, such as storage devices, may store program instructions that are executable by one or more processors to implement any of the methods, disclosed herein.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DETAILED DESCRIPTION

Methods and systems consisted with disclosed embodiments examine the temporal and spatial characteristics of lookup patterns for domains to detect domains used for unscrupulous activities, such as spam, malware, phishing attacks, and botnet command-and-control activities.

In particular, disclosed embodiments may characterize lookup patterns based on an Internet-wide view of these lookup patterns. This perspective allows embodiments to identify IP sub-networks that host recursive resolvers that issue a lookup for a particular domain. This global perspective, combined with information about when a particular domain was registered, allows embodiments to characterize both the spatial and temporal lookup patterns for individual domains (for example, "which server is looking up what, and when?") and identify characteristics unique to domains that are associated with malicious behavior.

Disclosed embodiments may look for variance in the servers that look up a domain because some malicious domains, such as botnet and phishing domains, tend to exhibit more variance in the servers that look up these domains. Disclosed embodiments also look at the popularity growth of a domain after registration because malicious sites tend to become popular considerably more quickly after initial registration time than legitimate sites. In such embodiments, the system uses the quantity of queries from the servers for a period of time after the domains are registered to identify malicious domains.

Other disclosed embodiments measure the similarity of servers that query a domain and cluster domains based on the similarity of those servers. Such network-wide spatial lookup patterns may identify malicious domains because domains that are used for malicious purposes may be looked up by similar groups of servers. Disclosed embodiments may use such spatial lookup patterns as input to a blacklist process. Thus, disclosed embodiments use the distinct spatial and temporal characteristics of malicious domains, and their tendency to exhibit similar lookup behavior, to more effectively and quickly blacklist domains based on these differing lookup patterns.

To characterize DNS lookup patterns across servers, disclosed embodiments use information about DNS lookups collected from top-level domain servers, such as the VeriSign top-level domain servers, coupled with registration information about these domains. These two pieces of information allow disclosed embodiments to characterize the spatial properties of DNS lookups across the Internet. Disclosed embodiments perform a joint analysis with information about when the domains were registered to explore the temporal properties of DNS lookups after their registration time.

Reference will now be made in detail to exemplary embodiments, examples of which are illustrated in the accompanying drawings. Wherever convenient, the same reference numbers will be used throughout the drawings to refer to the same or like parts.

Figure 1:
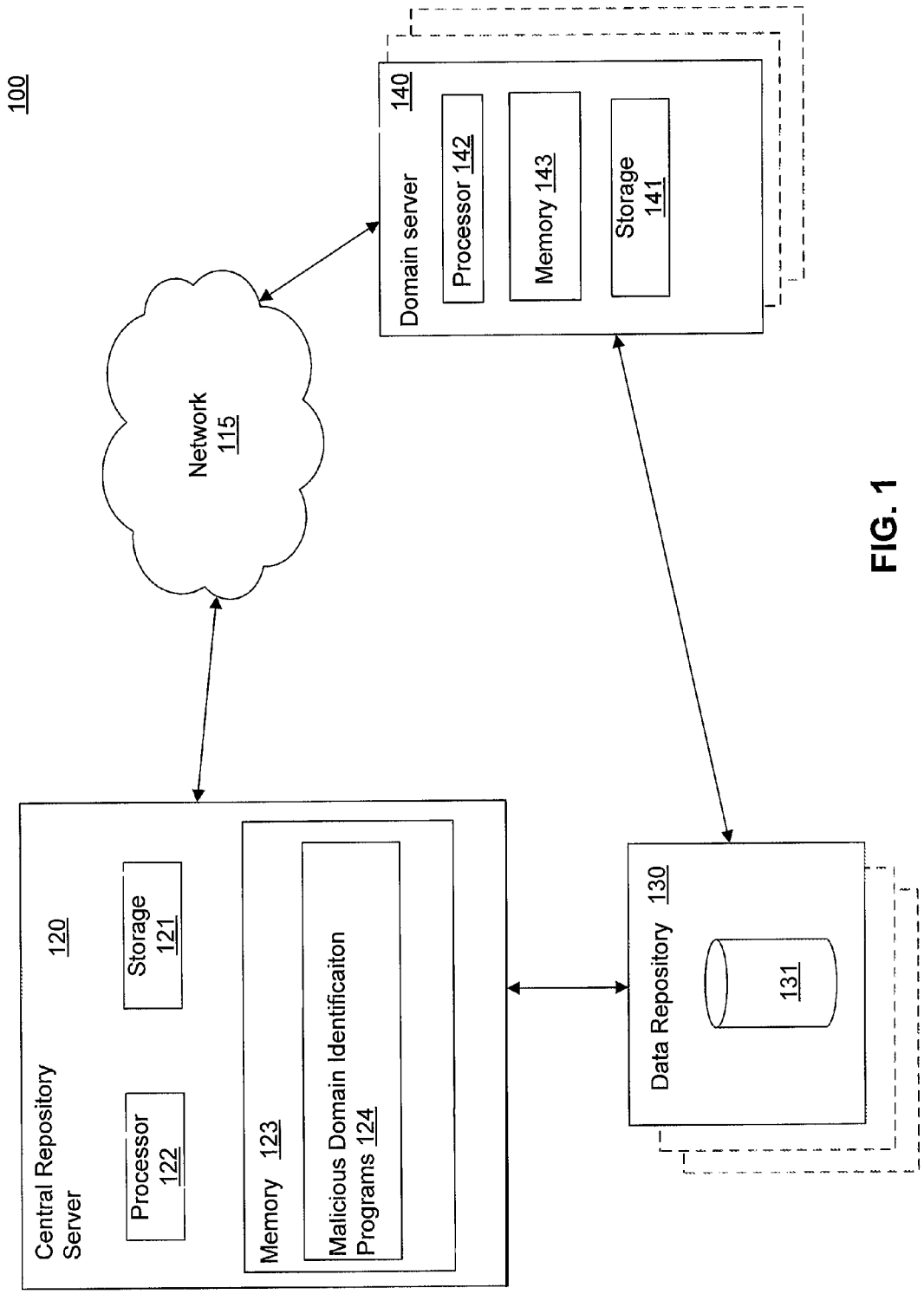
FIG. 1 is a diagram illustrating an exemplary malicious domain identification system that may be used to implement disclosed embodiments.

FIG. 1 is a diagram illustrating an exemplary malicious domain identification system 100 that may be used to implement disclosed embodiments, including exemplary system components. The components and arrangement, however, may be varied. Central repository server 120 may include a processor 122, a memory 123, input/output (I/O) devices (not shown), and storage 121. Central repository server 120 may be implemented in various ways. For example, central repository server 120 may be a general purpose computer, a server, a mainframe computer, or any combination of these components. Central repository server 120 may communicate over a link with network 115. For example, the link may be a direct communication link, a LAN, a WAN, or other suitable connection. Network 115 may include the Internet. Central repository server 120 may be standalone or it may be part of a subsystem, which may, in turn, be part of a larger system, such as a legacy name server system.

Processor 122 may include one or more known processing devices, such as a microprocessor from the Pentium™ or Xeon™ family manufactured by Intel™, the Turion™ family manufactured by AMD™, or any of various processors manufactured by Sun Microsystems. Memory 123 may include one or more storage devices configured to store information used by processor 122 to perform certain functions related to disclosed embodiments. Storage 121 may include a volatile or non-volatile, magnetic, semiconductor, tape, optical, removable, nonremovable, or other type of storage device or computer-readable medium.

In one embodiment, memory 123 may include one or more malicious domain identification programs or subprograms 124 loaded from storage 121 or elsewhere that, when executed by processor 122, perform various procedures, operations, or processes consistent with disclosed embodiments. For example, memory 123 may include a collection program that queries various top-level or second-level domain name servers and collects data from each server. In one embodiment, the collection program may perform procedures, operations, or processes disclosed in U.S. patent application Ser. No. 13/077,344, directed to SYSTEMS AND METHODS FOR COLLECTING AND STORING NETWORK TRAFFIC DATA, filed Mar. 31, 2011, which is incorporated herein by reference. For example, memory 123 may include a network traffic collection program that goes to various edge sites and imports log files from each site and a network traffic processing program that reads the log files to extract data, formats the extracted data, and stores the data in a database or other data repository. In other embodiments, the edge sites may extract data from the log files and the network traffic collection program may collect and store the extracted files. In some embodiments, the stored data may have a format similar to the DNZA record and the DNS query record shown in Table 1, or the stored data may be queried and formatted to supply the information shown in the DNZA record and the DNS query record of Table 1. However, embodiments are not limited to a specific manner of collecting DNS traffic data, so long as the traffic data represents a top-level domain view of the DNS requests.

Programs 124 may also include an analysis program that reads the information from the domain name servers and analyzes the data to determine spatial and temporal lookup patterns for various domains and a reporting program that generates output representing domains suspected of malicious activity. Programs 124 may also include an integrative support program that links the other programs and allows them to use a common database, provides a common user interface, performs basic bookkeeping tasks (such as deleting the collected data after the data has been analyzed), provides user guidance and help, etc. Memory 123 may also include other programs that perform other functions and processes, such as programs that provide communication support, Internet access, etc.

Methods, systems, and articles of manufacture consistent with disclosed embodiments are not limited to separate programs or computers configured to perform dedicated tasks. For example, memory 123 may be configured with a malicious domain identification program 124 that performs several functions when executed by processor 122. For example, memory 123 may include a single program 124 that performs the functions of the malicious domain identification system, or program 124 could comprise multiple programs. Moreover, processor 122 may execute one or more programs located remotely from central repository server 120. For example, central repository server 120 may access one or more remote programs that, when executed, perform functions related to disclosed embodiments.

Memory 123 may be also be configured with an operating system (not shown) that performs several functions well known in the art when executed by central repository server 120. By way of example, the operating system may be Microsoft Windows™, Unix™, Linux™, Solaris™, or some other operating system.

Central repository server 120 may include one or more I/O devices (not shown) that allow data to be received and/or transmitted by central repository server 120. I/O devices may also include one or more digital and/or analog communication input/output devices that allow central repository server 120 to communicate with other machines and devices, such as top-level domain name server 140, or client computers (not shown). Client computers may provide requests from users representing queries directed to the data stored in storage 121 or data repository 130. Central repository server 120 may receive data from external machines and devices and output data to external machines and devices via I/O devices. The configuration and number of input and/or output devices incorporated in I/O devices may vary as appropriate for certain embodiments.

Central repository server 120 may also be communicatively connected to one or more data repositories 130, e.g., through network 115. Data repository 130 may include one or more files or databases 131 that store information and are accessed and/or managed through central repository server 120. By way of example, the databases may be Oracle™ databases, Sybase™ databases, other relational databases, or non-relational databases, such as HBase, Cassandra, or Hadoop sequence files. The databases or other files may include, for example, data and information related to DNS requests, domain registration information, etc. Data repository 130 may store domain registration information as well as DNS query information relating to DNS requests. Systems and methods of disclosed embodiments, however, are not limited to separate databases or the use of a database.

Central repository server 120 may be communicatively connected to one or more domain servers 140 through network 115. In some embodiments, domain server 140 may be owned or operated by a root name server operator, known as a top-level domain name server. In some embodiments, domain server 140 may be a recursive server Domain server 140 may process DNS packet requests and store information about the requests, such as the domain requested, the date of the request, and the server that requested the domain, for example, in log files. Domain server 140 may include processor 142, storage 141, and memory 143. Storage 141 may be a volatile or non-volatile, magnetic, semiconductor, tape, optical, removable, nonremovable, or other type of storage device or computer-readable medium and may store the log files. Domain server 140 may also be connected to data repository 130.

Figure 2:
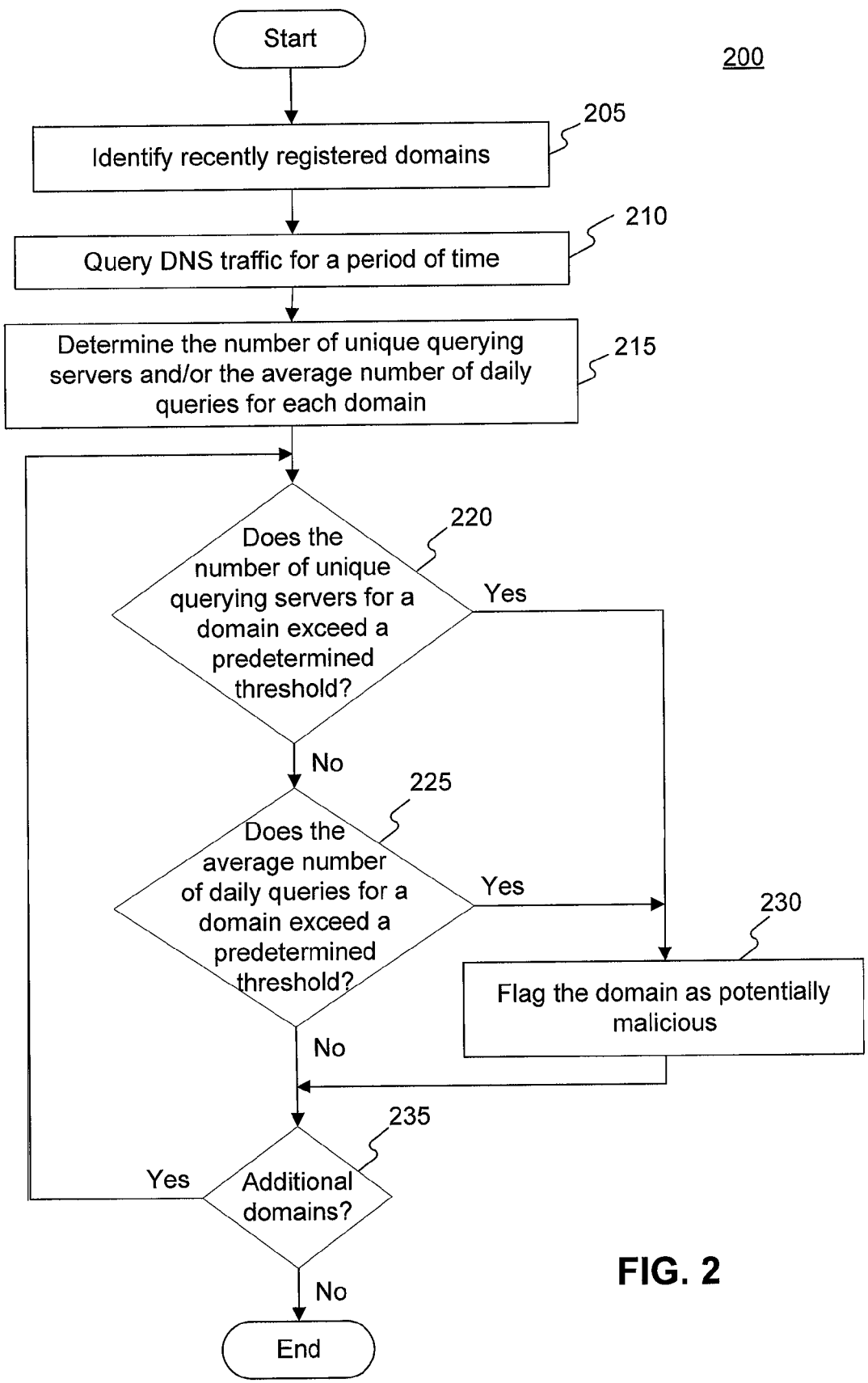
FIG. 2 is a flow diagram illustrating an exemplary process for identifying malicious domains based on temporal lookup patterns, consistent with disclosed embodiments.

FIG. 2 is a flow diagram illustrating an exemplary process 200 for identifying malicious domains based on temporal lookup patterns, consistent with disclosed embodiments. Malicious domains are typically queried by a much wider range of sub-networks, particularly for newly registered domains. Domains that appear in blacklists are queried by thousands of distinct recursive servers, often within a few days of when the domain was registered. This varies markedly from the behavior of newly registered legitimate domains, which become "popular" less quickly. Central repository server 120 may implement process 200 to identify malicious domains based on, for example, the number of queries to the domain in a period after registration, the number of unique recursive servers or sub-networks making those queries, etc.

In step 205, central repository server 120 may identify a recently registered domain or domains. For example, central repository server 120 may use the "addnew" command in the zone DNZA files to identify the registration of new domains. In other embodiments, registration information may be stored in a database, for example, in data repository 130. In some embodiments, central repository server may select domains registered at least 1 day ago and not more than two months ago. In other embodiments, central repository server may select domains registered in the past six months. Although embodiments are not limited to a specific time period, a recent time period may be preferred in some embodiments because identifying malicious domains in a short period of time after registration may alleviate or prevent the harmful impact of the malicious domains. Central repository server 120 may identify potentially malicious domains in as little as a few days after registration. However, because not all domains exhibit malicious behavior in the first days after registration, embodiments may select domains registered over a larger period, such as the most recent one or two months.

In step 210, central repository server 120 may look at DNS packet requests for the identified domain(s) over a period of time. For example, central repository server 120 may use log records stored at a TLD server or may use a query record such as the query record shown in Table 1. The period of time for which central repository server 120 queries the DNS traffic may be set by a system parameter or by a user, In some embodiments, the period of time may be 15 days. In other embodiments, the period of time may be 20 days, 25 days, 30 days or more.

Once central repository server 120 receives the results of the query, in step 215, central repository server 120 may determine the number of unique servers responsible for the DNS requests for each domain. In certain embodiments, a server may represent the recursive server, or the collection of recursive servers represented by a particular IP address prefix (/24 sub-network). When a domain is queried by many different regions, it may be considered widely "popular." However, it takes a relatively long period of time for legitimate domains to become popular. In contrast, malicious domains may see a high number of unique servers in a short period of time after registration. Therefore, central repository server 120 may determine the number of unique querying servers for each of the identified domains.

Next, in step 220, central repository server 120 may determine whether the number of unique querying servers exceeds a predetermined threshold. For example, malicious domains often average more than 50 unique querying servers per day, so some embodiments may use a predetermined threshold of 50. However, embodiments are not limited to a specific value for the threshold, so long as the threshold represents a value that distinguishes an expected legitimate number of unique querying servers from an unexpected number If central repository server 120 does determine that the number of querying servers exceeds the threshold (step 220, Yes), then in step 230, central repository server 120 may identify the domain as malicious or potentially malicious. For example, central repository server 120 may create a report or display listing the domain. The report may be sent to or printed by a user for further investigation. Alternatively, the domain may be automatically added to one or more black lists. In yet other embodiments, central repository server 120 may send the domain to a command and control center for further investigation.

In some embodiments (not shown), central repository server 120 may calculate a confidence level for the domain. For example, if the threshold is 50 unique querying servers per day and domains with more than this are identified as potentially malicious, if a particular domain has 55 unique querying servers, the confidence level for the particular domain may be low because the number of unique querying servers is close to the threshold. On the other hand, if the particular domain has 200 unique querying servers, the confidence level for the particular domain may be high because the number of unique querying servers exceeds the threshold by a large amount. In such embodiments, when a confidence level is high, central repository server 120 may automatically add the domain to a blacklist but when the confidence level is low, central repository server 120 may perform other actions, such as restricting the traffic to the domain or presenting the domain to a user for further investigation, or adding the domain to a "watch list."

If the number of unique querying servers does not exceed a predetermined threshold (step 220, No) then, in step 225, central repository server 120 may determine whether the average number of daily queries exceeds a predetermined threshold. If so (step 225, Yes), then the domain is identified as malicious or potentially malicious, as discussed above. In step 235, central repository server 120 may determine whether any remaining identified domains exist. If so (step 235, Yes), then central repository server 120 may process the next domain using steps 220 through 230. If no additional domains remain (step 235, No), then process 200 ends.

In some embodiments (not shown), an investigation into the domains identified as malicious may indicate that the threshold value needs to be adjusted. In such embodiments, central repository server 120 may enable a user to adjust the threshold so that fewer legitimate domains are identified as potentially malicious, or so that more malicious domains are captured by the threshold.

Figure 3:
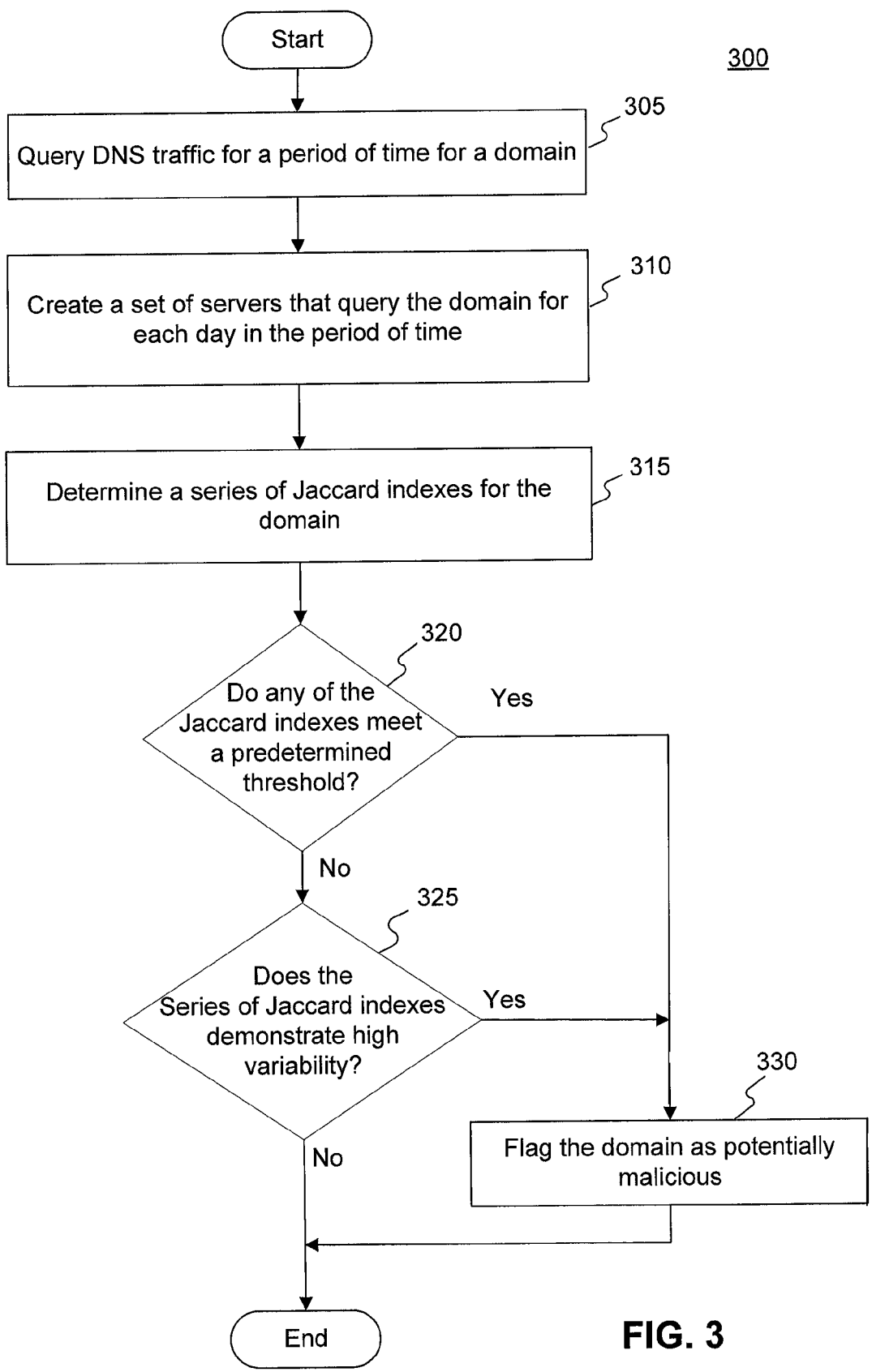
FIG. 3 is a flow diagram illustrating an exemplary process for identifying malicious domains based on variability, consistent with disclosed embodiments.

FIG. 3 is a flow diagram illustrating an exemplary process 300 for identifying malicious domains based on variability, consistent with disclosed embodiments. Domains associated with scams (e.g. phishing) and botnets exhibit more churn, for example, irregular variability in the number of servers that query the domain. Although the set of recursive servers looking up any domain does vary from day-to-day, this variability is much more irregular for domains that are associated with spam and phishing attacks. Central repository server 120 may use process 300 to identify domains associated with such malicious activity.

In step 305, central repository server 120 may query the DNS traffic for a period of time for a particular domain. In one embodiment the period of time may be one month, but the period of time may be any period of time that is statistically significant, and embodiments are not limited to any specific period of time. In step 310, central repository server 120 creates a set of the servers or networks that queried the particular domain for each day in the period. In some embodiments, central repository server 120 may use unique recursive servers, but in other embodiments central repository server 120 may aggregate the IP addresses of the DNS traffic using a prefix of the IP address (e.g. to the level of /24 sub-network blocks), as described above, and form the set at the level of the prefix addresses. In other embodiments, central repository server 120 may aggregate the corresponding Autonomous System (AS) numbers of the /24 sub-network blocks to form the set. In certain embodiments, a server may represent the recursive server, or the collection of recursive servers represented by a particular IP address prefix (/24 sub-network), or by the collection of recursive servers represented by a particular AS number.

In step 315, central repository server 120 may determine a value representing the similarity of the servers that query the domain for pairs of consecutive days. In some embodiments, the value may be a Jaccard index for the domain. For example, if the set of servers querying the domain on a first day is represented by A and the set of servers querying the domain on a second day is represented by B, the Jaccard index for the two days may be represented as $$J(A, B) = \frac{|A \cap B|}{|A \cup B|},$$

with the value of J(A,B) ranging from zero to one. To determine a series of Jaccard indexes, central repository server 120 may calculate a Jaccard index for each pair of consecutive days in a period of days. In this manner, central repository server 120 may use the Jaccard index to check the similarity of the sets' dynamics over time.

In step 320, central repository server 120 may determine whether any of the Jaccard indexes meet a predetermined threshold. For example, malicious domains sometimes have no overlapping servers that query the domain from one day to the next while legitimate domains have a more consistent level of overlapping servers. Accordingly, embodiments may use a Jaccard index of 0.1 for the threshold, so that any Jaccard indexes below 0.1 meet the threshold. Malicious domains also exhibit a high number of queries from the same servers day-to-day, so some embodiments may use a threshold of 0.5, with any Jaccard index greater than 0.5 meeting the threshold. In certain embodiments, if any Jaccard index in the series of Jaccard indexes for the domain meets the threshold (step 320, Yes) then, in step 330, central repository server 120 may identify the domain as potentially malicious, for example, in the manner described with regard to step 230 of FIG. 2.

In some embodiments (not shown), central repository server 120 may calculate a confidence level for the domain. For example, if the threshold is a Jaccard index of 0.1 and domains with less than this are identified as potentially malicious, if a particular domain has a Jaccard index of 0.09, the confidence level for the particular domain may be low because the Jaccard index is close to the threshold. On the other hand, if the particular domain has a Jaccard index of zero, the confidence level for the particular domain may be high because the index falls well below the threshold. In such embodiments, when a confidence level is high, central repository server 120 may automatically add the domain to a blacklist but when the confidence level is low, central repository server 120 may perform other actions, such as restricting the traffic to the domain or presenting the domain to a user for further investigation, or adding the domain to a "watch list."

If no Jaccard indexes meet a predetermined threshold (step 320, No) then, in step 325, central repository server 120 may determine whether the series of Jaccard indexes for the domain demonstrates high variability. For example, central repository server 120 may use a coefficient of variation (a ratio of the standard deviation to the mean) to measure the variability of the series of Jaccard indexes. A large coefficient value indicates more dynamic change in the series. In some embodiments a coefficient greater than one may indicate high variability in the series of Jaccard indexes. If central repository server 120 determines that the series of Jaccard indexes exhibits high variability (step 325, Yes) then, in step 330, central repository server 120 may identify the domain as malicious or potentially malicious, as described above. Central repository server 120 may repeat process 300 for a number of domains. In some embodiments, central repository server 120 may select the domains at random for process 300.

Figure 4:
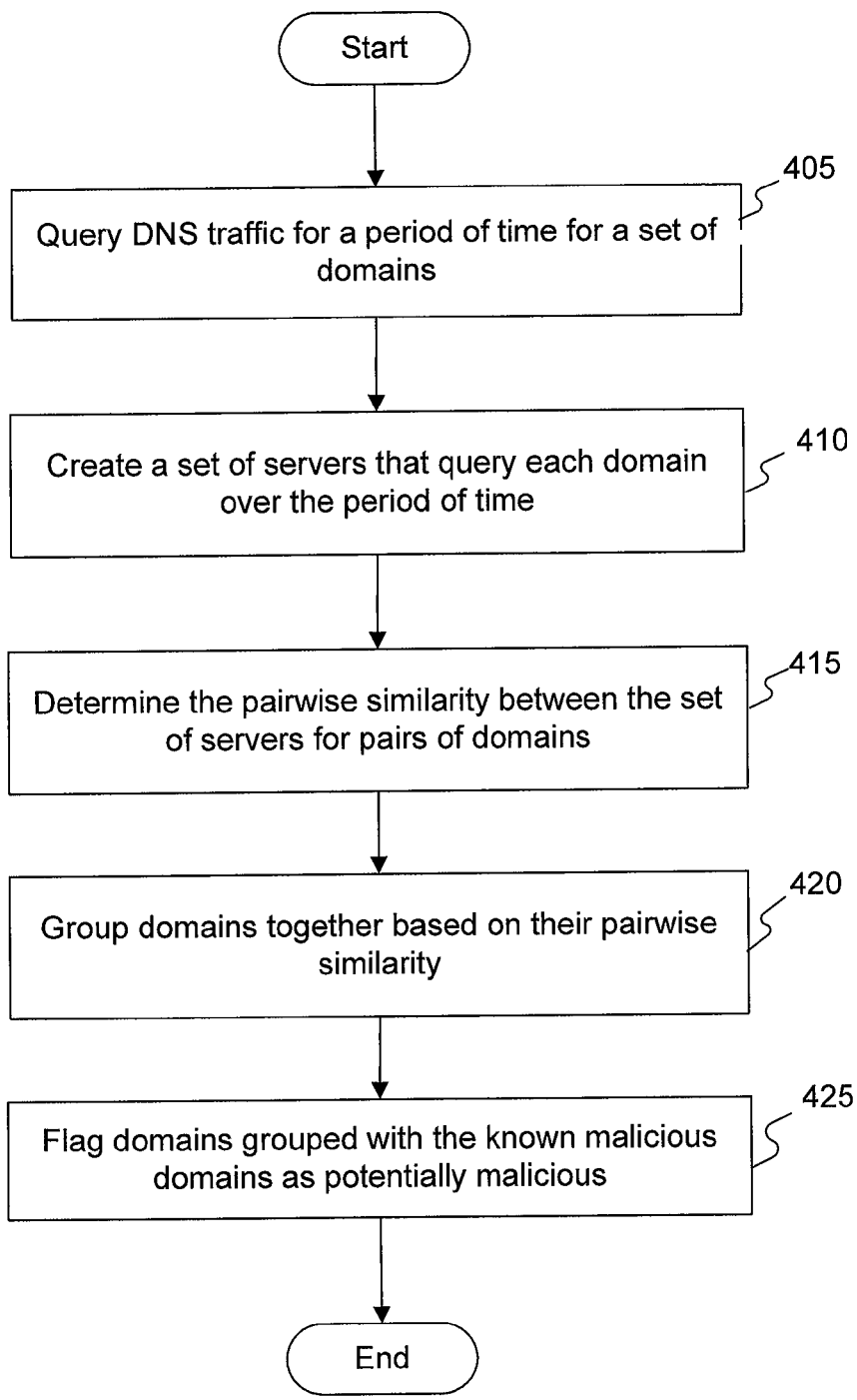
FIG. 4 is a flow diagram illustrating an exemplary process for identifying malicious domains based on spatial lookup patterns, consistent with disclosed embodiments.

FIG. 4 is a flow diagram illustrating an exemplary process 400 for identifying malicious domains based on spatial lookup patterns, consistent with disclosed embodiments. Domains that exhibit similar spatial lookup patterns also exhibit other similarities. Central repository server 120 may use process 400 to create clusters of domains by grouping domains together when they are looked up by similar groups of servers and use the clustering to identify domains as potentially malicious.

In step 410, central repository server 120 may query the DNS traffic for a period of time for a set of domains, In some embodiments, the set of domains includes at least some known malicious domains. The set may include domains selected at random in addition to known malicious domains. In one embodiment the period of time may be a week, but the period of time may be any period of time that is statistically significant and embodiments are not limited to any specific period of time. In step 410, central repository server 120 may create a set of servers that query each domain over the period of time. The set of servers may be recursive servers, an aggregation of the recursive servers to the level of /24 sub-network blocks (i.e. using the prefix of the IP address of the server), etc. Central repository server 120 may use any of the techniques described above with regard to FIG. 3 to gather and aggregate the set of servers. In some embodiments, central repository server 120 may use a subset of the sets created during process 300 as input for step 410.

In step 415, central repository server 120 may determine the pairwise similarity between domains in the set of domains. Central repository server 120 may measure the similarity among domains in the set by using a pairwise Jaccard index of the servers that query the domains. A pairwise similarity index may be represented by the formula $$S(A, B) = \frac{\sum_{i=1}^{n} J(a_i, b_i)}{n},$$

where A is a domain with the set of querying servers $\{a_1, a_2, \ldots a_n\}$ and B is a different domain with a set of querying servers $\{b_1, b_2, \ldots b_n\}$ over n days (i.e. the period of time) and $J(a_i, b_i)$ is the Jaccard index of set $a_i$ and $b_i$. Central repository server 120 may calculate the pairwise similarity between each pair of domains in the set, or may calculate the similarities on a subset of the total number of pairs, for example, stopping after 10,000 comparisons.

In step 420, central repository server 120 may group domains based on the pairwise similarity using single-linkage clustering, as is known in the art. Single-linkage clustering is a method of calculating distances between clusters. In step 425, central repository server 120 may identify the clusters that include the known malicious domains and identify the domains in the cluster as potentially malicious, as discussed above with regard to step 230 of FIG. 2.

In some embodiments (not shown), central repository server 120 may calculate a confidence level for the groups. For example, if a group contains three known malicious domains, the confidence level for the group may be high. On the other hand, if the particular domain has one or more known legitimate sites, the confidence level may be low. In such embodiments, when a confidence level is high, central repository server 120 may automatically add the domain to a blacklist but when the confidence level is low, central repository server 120 may perform other actions, such as restricting the traffic to the domain or presenting the domain to a user for further investigation, or adding the domain to a "watch list."

In some embodiments (not shown), central repository server may include known legitimate domains in the set of domains. In such an embodiment, central repository server may identify domains that do not group with the legitimate domains as malicious, although such identified domains may have a low confidence level.

Figure 5:
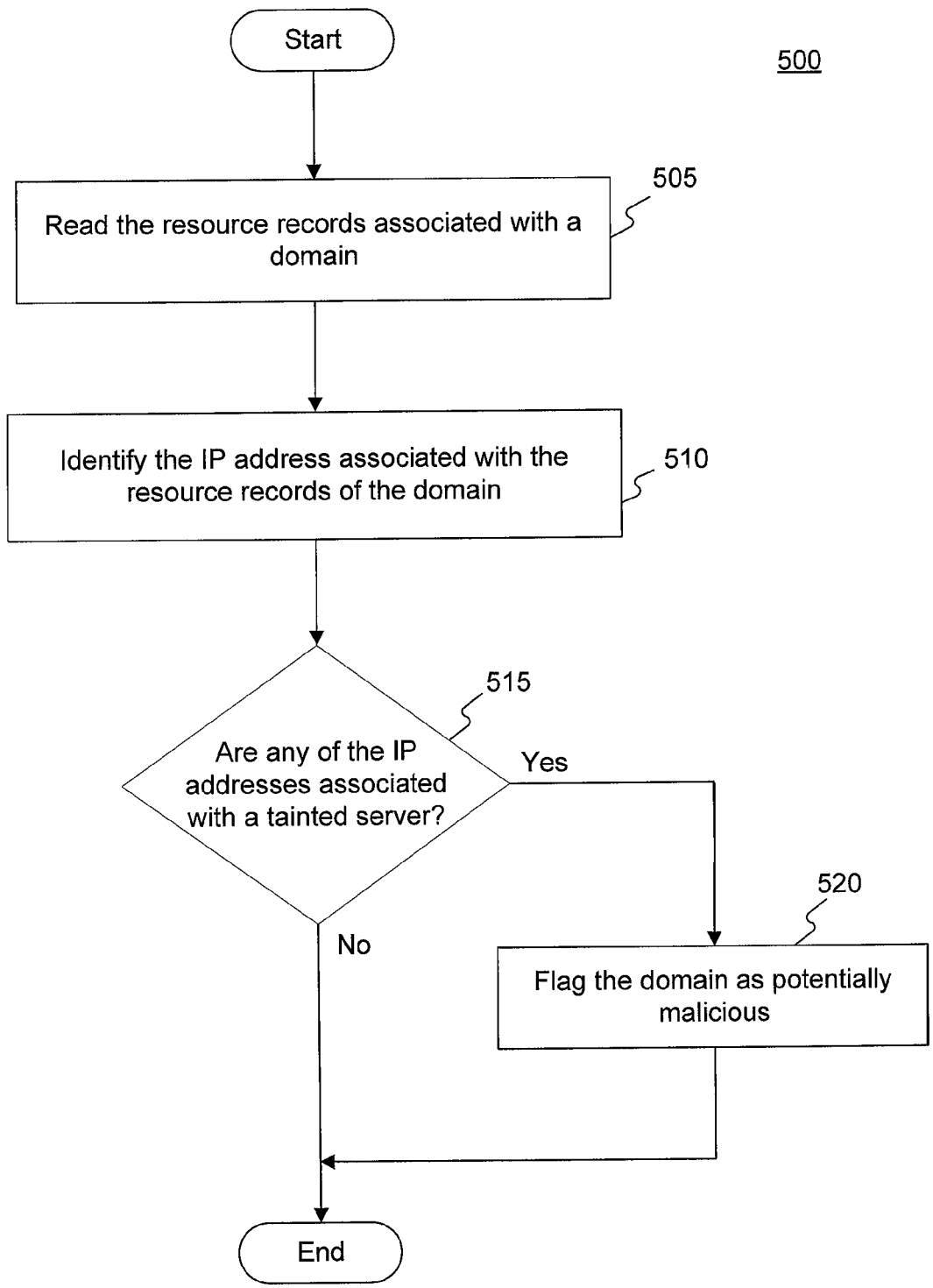
FIG. 5 is a flow diagram illustrating an exemplary process for identifying malicious domains based on registration records, consistent with disclosed embodiments.

FIG. 5 is a flow diagram illustrating an exemplary process 500 for identifying potentially malicious domains based on registration records, consistent with disclosed embodiments. Many newly registered (second-level) domains use resource records that have been used by other existing domains. For example, the IP addresses of NS-type, MX-type, and A-type records may be shared by multiple domains. Malicious domains often reuse IP addresses belonging to a small set of Autonomous Systems (ASes). Autonomous Systems are collections of IP addresses with a common prefix. Central repository server 120 may use process 500 to identify potentially malicious domains based on the IP addresses obtained from the resource records.

In step 505, central repository server 120 may read the resource records associated with a domain. As explained above, the resource records may include information needed to register the domain and are supplied at the time of registration. Resource records include the NS-type, the A-type, and the MX-type of records, although disclosed embodiments are not limited to these particular resource records.

In step 510, central repository server 120 may identify the IP address associated with each resource record. For example, the NS-type record identifies an IP address of an authoritative name server, the MX-type record identifies a mail exchange server IP address, and the A-type record identifies a host IP address. Disclosed embodiments may also use the IP address of other resource records.

In step 515, central repository server 120 may determine whether one or more of the identified IP addresses are associated with a tainted server. For example, central repository server 120 may categorize a server as tainted if it is associated with a predetermined percentage of known malicious domains. For example, if more than 20% of the domains associated with a server are known to be malicious, then central repository server 120 may consider the server tainted. In other embodiments, if a server is associated with a known legitimate domain, central repository server 120 may not consider the server tainted. In certain embodiments, the server may be an AS, which represents a collection of IP address prefixes. If the IP addresses are associated with a tainted server (step 515, Yes) then, in step 520, central repository server 120 may flag the domain as potentially malicious. Some ASes may be known to host resource records only for malicious domains. In such a circumstance, central repository server 120 may determine that a high confidence level that a domain with an IP address associated with the AS is malicious.

In some embodiments, if central repository server 120 flags the domain as potentially malicious, then central repository server 120 may further analyze the DNS lookup patterns of the domain, for example, using one or more of processes 200, 300, and 400, described above. In other embodiments, central repository server 120 may use process 500 in determining a confidence level for a domain flagged as malicious by one or more of processes 200, 300, and 400. For example, if a domain was flagged as malicious by process 200, central repository server 120 may initiate process 500 for the flagged domain. If process 500 also flags the domain as potentially malicious, central repository server 120 may determine that the confidence level is high that the domain is malicious and add the domain automatically to a blacklist. Conversely, if process 500 does not flag the domain as malicious, then central repository server 120 may determine that the confidence level is low. If the confidence level is low, central repository server 120 may cause the traffic to the domain to be limited, or may add the domain to a list of domains to be watched, e.g. through process 200 or 300.

Disclosed embodiments may use a combination of processes 200-500 to determine a confidence level for the domain. For example, if central repository server 120 identifies the domain as potentially malicious using process 200 but not using process 300 or process 500, the confidence level may be considered low. However, if central repository server 120 identifies the domain as potentially malicious using process 200 and 500, the confidence level may be considered high. Accordingly, central repository server 120 may analyze whether a domain has been flagged as potentially malicious by one or more of the methods disclose herein and determine a confidence level based on the analysis. As discussed above, if central repository server 120 determines that the confidence level is high, a domain may be added automatically to a blacklist.

Once a recently registered domain has been identified as potentially malicious, disclosed embodiments may also monitor the country-level information of DNS lookups for the domain. Central repository server 120 may determine the country-level information by getting the approximate latitude and longitude of the recursive servers, or of the region represented by the prefix of the IP address of the recursive servers, that query the domain. This information may show how malware propagates geographically For example, central repository server 120 may determine from what countries the highest number of queries are coming from. In response, central repository server 120 may generate data used to identify those countries as in need of increased security measures. Central repository server 120 may also determine what countries have servers which have recently been started querying the domain. These countries may also be identified as in need of increased security measures.

The foregoing descriptions have been presented for purposes of illustration and description. They are not exhaustive and do not limit the disclosed embodiments to the precise form disclosed. Modifications and variations are possible in light of the above teachings or may be acquired from practicing the disclosed embodiments. For example, the described implementation includes software, but the disclosed embodiments may be implemented as a combination of hardware and software or in firmware. Examples of hardware include computing or processing systems, including personal computers, servers, laptops, mainframes, micro-processors, and the like. Additionally, although disclosed aspects are described as being stored in a memory on a computer, one skilled in the art will appreciate that these aspects can also be stored on other types of computer-readable storage media, such as secondary storage devices, like hard disks, floppy disks, a CD-ROM, USB media, DVD, or other forms of RAM or ROM.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), XML, Java, C++, JavaScript, HTML, HTML/AJAX, Flex, Silverlight, or any other now known or later created programming language. One or more of such software sections or modules can be integrated into a computer system or existing browser software.

Other embodiments will be apparent to those skilled in the art from consideration of the specification and practice of the embodiments disclosed herein. The recitations in the claims are to be interpreted broadly based on the language employed in the claims and not limited to examples described in the present specification or during the prosecution of the application, which examples are to be construed non-exclusive. Further, the steps of the disclosed methods may be modified in any manner, including by reordering steps and/or inserting or deleting steps. It is intended, therefore, that the specification and examples be considered as exemplary only, with a true scope and spirit being indicated by the following claims and their full scope equivalents.

What is claimed is:

1. A computer-implemented method of determining that a newly-registered domain is potentially malicious, the method comprising:
    determining, by a processor, a number of unique name servers that sent a query for the newly-registered domain during a period of time;
    determining, by the processor, that the number of unique servers exceeds a predetermined threshold of servers;
    identifying the newly-registered domain as one of malicious and potentially malicious when it is determined that the number of unique name servers exceeds the predetermined threshold of servers;
    in response to determining that the number of unique name servers exceeds the predetermined threshold of servers, determining a confidence level based on an amount by which the number of unique name servers exceeds the predetermined threshold of servers; and
    automatically adding the newly-registered domain to a blacklist when the confidence level is high.

2. The method of claim 1, further comprising:
    for the period of time, determining an average number of queries per day for the newly registered domain;
    determining that the average number of queries exceeds a predetermined threshold of queries per day; and
    identifying the newly-registered domain as one of malicious and potentially malicious in response to determining that the average number of queries exceeds a predetermined threshold of queries per day.

3. The method of claim 1, wherein each unique name server is an aggregation of name servers sharing a same IP address prefix.

4. The method of claim 1, further comprising:
    in response to determining that the number of unique name servers exceeds the predetermined threshold of servers, determining a confidence level based on an amount by which the number of unique name servers exceeds the predetermined threshold of servers; and
    limiting traffic to the newly-registered domain when the confidence level is not high.

5. The method of claim 1, further comprising:
    adjusting the predetermined threshold of servers based on data used to identify the newly-registered domain as one of malicious and potentially malicious.

6. The method of claim 1, further comprising:
    responsive to identifying the newly-registered domain as one of malicious and potentially malicious:
        identifying an IP address associated with a registration record for the newly-registered domain, and
        determining a confidence level based on whether the IP address is associated with a tainted server.

7. A system for determining that a newly-registered domain is potentially malicious, the system comprising:
    a processor; and
    a memory having instructions, that when executed by the processor, cause the processor to perform operations including:
        determining, by a processor, a number of unique name servers that sent a query for the newly-registered domain during a period of time,
        determining, by the processor, that the number of unique name servers exceeds a predetermined threshold of servers;
        identifying the newly-registered domain as one of malicious and potentially malicious in response to determining that the number of unique name servers exceeds the predetermined threshold of servers; and
        responsive to identifying the newly-registered domain as one of malicious and potentially malicious:
            identifying an IP address associated with a registration record for the newly-registered domain, and
            determining a confidence level based on whether the IP address is associated with a tainted server.

8. The system of claim 7, wherein the operations performed by the processor further comprise:
    for the period of time, determining an average number of queries per day for the newly-registered domain;
    determining that the average number of queries exceeds a predetermined threshold of queries per day; and
    identifying the newly-registered domain as one of malicious and potentially malicious when it is determined that the average number of queries exceeds a predetermined threshold of queries per day.

9. The system of claim 7, wherein each unique server is an aggregation of servers sharing a same IP address prefix.

10. A tangible non-transitory computer-readable medium storing instructions for determining that a newly-registered domain is potentially malicious, the instructions causing one or more computer processors to perform operations, comprising:
    determining a number of unique name servers that sent a query for the newly-registered domain during a period of time;

determining that the number of unique name servers exceeds a predetermined threshold of servers;

identifying the newly-registered domain as one of malicious and potentially malicious in response to determining that the number of unique name servers exceeds the predetermined threshold of servers; and responsive to identifying the newly-registered domain as one of malicious and potentially malicious:

identifying an IP address associated with a registration record for the newly-registered domain, and determining a confidence level based on whether the IP address is associated with a tainted server.

11. A computer-implemented method for identifying an Internet domain as potentially malicious comprising:

identifying unique name servers that query the Internet domain during a first day;

identifying unique name servers that query the domain during a second day;

determining, by a processor, a similarity of the unique name servers that queried the Internet domain during the first day and the unique name servers that queried the Internet domain during the second day;

determining, by the processor, that the similarity meets a predetermined threshold;

identifying the Internet domain as one of malicious and potentially malicious in response to determining that the similarity meets the predetermined threshold;

determining a confidence level based on a difference between the similarity and the predetermined threshold; and automatically adding the domain to a blacklist when the confidence level is high.

12. The method of claim 11, further comprising:

identifying unique name servers that query the domain for a series of days, and wherein determining the similarity further comprises calculating a series of values representing the similarity of the unique name servers that query the domain for pairs of consecutive days in the series of days;

analyzing the series of values for high variability; and identifying the domain as one of malicious and potentially malicious when the series of values demonstrates high variability.

13. The method of claim 11, wherein determining the similarity comprises calculating a Jaccard index.

14. The method of claim 11, further comprising:

determining a confidence level based on a difference between the similarity and the predetermined threshold; and limiting traffic to the domain when the confidence level is not high.

15. The method of claim 11, further comprising: adjusting the predetermined threshold based on data used to flag the domain as one of malicious and potentially malicious.

16. A system for identifying an Internet domain as potentially malicious comprising:

a processor; and a memory having instructions that, when executed by the processor, cause the processor to perform operations comprising:

identifying unique name servers that query the domain during a first day, identifying unique name servers that query the domain during a second day, determining, by a processor, the similarity of the name servers that queried the domain during the first day and the name servers that queried the domain during the second day, determining, by the processor, that the similarity meets a predetermined threshold;

identifying the domain as one of malicious and potentially malicious in response to determining that the similarity of the servers meets the predetermined threshold;

determining a confidence level based on a difference between the similarity of the servers and the predetermined threshold; and automatically adding the domain to a blacklist when the confidence level is high.

17. The system of claim 16, wherein the operations further comprise:

identifying unique name servers that query the domain for a series of days, and wherein determining the similarity further comprises calculating a series of values representing the similarity of the unique name servers that query the domain for pairs of consecutive days in the series of days;

analyzing the series of values for high variability; and identifying the domain as one of malicious and potentially malicious when the series of values demonstrates high variability.

18. The system of claim 16, wherein the operations further comprise:

determining a confidence level based on a difference between the similarity and the predetermined threshold; and limiting traffic to the domain when the confidence level is not high.

19. A tangible non-transitory computer-readable medium storing instructions for identifying an Internet domain as potentially malicious, the instructions causing one or more computer processors to perform operations, comprising:

identifying unique name servers that query the domain during a first day;

identifying unique name servers that query the domain during a second day; determining the similarity of the name servers that queried the domain during the first day and the name servers that queried the domain during the second day;

determining that the similarity meets a predetermined threshold;

identifying the domain as one of malicious and potentially malicious in response to determining that the similarity of the servers meets a predetermined threshold;

determining a confidence level based on a difference between the similarity and the predetermined threshold; and automatically adding the domain to a blacklist when the confidence level is high.

20. A computer-implemented method for identifying an Internet domain as potentially malicious comprising:

identifying, by a processor, a set of domains, the set including at least one known malicious domain;

determining, by the processor, a number of name servers that query each domain in the set of domains for each day over a period of time;

for a plurality of pairs of domains from the set of domains, analyzing a similarity of name servers that queried a first domain of the pair of domains and name servers that queried a second domain of the pair of domains;

grouping domains in the set of domains based on the analyzing;

identifying domains in a group that contains the known malicious domain as one of malicious and potentially malicious;

determining a confidence level for each group of domains that the domains in the group are malicious; and automatically adding a domain to a blacklist when the confidence level is high.

21. The method of claim 20, wherein each server is an aggregation of servers sharing a same IP address prefix.

22. The method of claim 20, wherein analyzing the similarity comprises calculating a pairwise Jaccard index for the pair of domains.

23. The method of claim 20, wherein the identifying domains includes automatically adding the domains to a blacklist.

24. The method of claim 20, further comprising:

determining a confidence level for each group of domains that the domains in the group are malicious; and limiting traffic to a domain when the confidence level is not high.

25. A system for identifying an Internet domain as potentially malicious comprising:

a processor; and a memory having instructions that, when executed by the processor, cause the processor to perform operations comprising:

identifying, by a processor, a set of domains, the set including at least one known malicious domain, determining, by the processor, a number of name servers that query each domain in the set of domains for each day over a period of time, for a plurality of pairs of domains from the set of domains, analyzing a similarity of name servers that queried a first domain of the pair of domains and name servers that queried a second domain of the pair of domains, grouping the domains based on the analyzing;

identifying domains in a group that contains the known malicious domain as one of malicious and potentially malicious;

determining a confidence level for each group of domains that the domains in the group are malicious; and automatically adding a domain to a blacklist when the confidence level is high.

26. The system of claim 25, wherein each server in the set of servers is an aggregation of servers sharing a same IP address prefix.

27. The system of claim 25, wherein the operations further comprise:

determining a confidence level for each group of domains that the domains in the group are malicious; and limiting the traffic to a domain when the confidence level is not high.

28. A tangible non-transitory computer-readable medium storing instructions for identifying an Internet domain as potentially malicious, the instructions causing one or more computer processors to perform operations, comprising:

identifying a set of domains, the set including at least one known malicious domain;

determining a number of name servers that query each domain in the set of domains for each day over a period of time;

for a plurality of pairs of domains from the set of domains, analyzing a similarity of name servers that queried a first domain of the pair of domains and name servers that queried a second domain of the pair of domains;

grouping the domains based on the analyzing;

identifying domains in a group that contains the known malicious domain as one of malicious and potentially malicious;

determining a confidence level for each group of domains that the domains in the group are malicious; and automatically adding a domain to a blacklist when the confidence level is high.

* * * * *